United States Patent [19]
Starowitz, Jr.

[11] Patent Number: 5,127,367
[45] Date of Patent: Jul. 7, 1992

[54] ANIMAL MAT

[76] Inventor: Henry F. Starowitz, Jr., 427 S. Jackson St., Batavia, N.Y. 14020

[21] Appl. No.: 636,207

[22] Filed: Dec. 31, 1990

[51] Int. Cl.⁵ .............................................. A01J 1/00
[52] U.S. Cl. ........................................ 119/28.5; 5/652
[58] Field of Search ............... 119/28.5, 156; 5/438, 5/487, 417, 418, 419, 420; 128/202.18

[56] References Cited

U.S. PATENT DOCUMENTS

| | | | |
|---|---|---|---|
| 233,954 | 1/1880 | Thompson | 5/438 X |
| 249,553 | 11/1881 | Snyder | 128/202.18 |
| 290,608 | 12/1883 | Snyder | 128/202.18 |
| 376,094 | 1/1888 | Hurlburt | 5/438 |
| 618,210 | 1/1899 | Shakespeare | 128/202.18 |
| 2,707,209 | 5/1955 | Taggart | 5/487 X |
| 3,065,751 | 11/1962 | Gobbo, Sr. et al. | 5/487 X |
| 3,137,871 | 6/1964 | Florio | 5/487 |
| 3,372,407 | 3/1968 | Weber, III | 5/438 X |
| 4,050,417 | 9/1977 | Ellis | 119/156 |
| 4,649,861 | 3/1987 | Elkins et al. | 119/156 X |
| 4,852,517 | 8/1989 | Smith et al. | 119/156 X |
| 5,038,431 | 8/1991 | Burgin et al. | 5/438 |

Primary Examiner—Gene Mancene
Assistant Examiner—Thomas Price
Attorney, Agent, or Firm—Leon Gilden

[57] ABSTRACT

A simple and inexpensive mat particularly suitable for domestic animals to provide a way of collecting loose fur. The mat is rectangularly shaped and in a preferred embodiment is formed from a top and bottom layer of biodegradable paper and an intermediate layer of cellulose material. Since the same material is used on both sides of the mat, it can be adapted to lay on the floor with either side facing upwards. The rough texture and static electricity of the paper along with the movement of the animal on the mat enables it to collect the loose fur. Small packages of insect killing powder can also be incorporated into the construction of the mat so as to facilitate both insect and loose hair control.

3 Claims, 4 Drawing Sheets

ANIMAL MAT

BACKGROUND OF THE INVENTION

1. Field of the Invention

The present invention relates to mats for domestic animals, and more particularly pertains to a mat which is designed to collect loose fur.

2. Description of the Prior Art

The use of mats for domestic animals is known in the prior art. More specifically, mats for domestic animals heretofore devised and utilized for the purpose of providing a resting place for such animals are known to consist basically of familiar, expected and obvious structural configurations, notwithstanding the myriad of designs encompassed by the crowded prior art which have been developed for the fulfillment of countless objectives and requirements.

In this respect, the prior art is replete with examples of mats for domestic animals. More specifically, U.S. Pat. No. 4,649,861, which issued to Marvin Elkins and Dwight L. Smith on Mar. 17, 1987, discloses a pet mat for domestic animals. The mat, as illustrated, comprises a top material layer impervious to insects, an intermediate material layer to trap insects, and a bottom material layer which is also impervious to insects. U.S. Pat. No. 4,852,517 is a continuation in part of U.S. Pat. No. 4,649,861, which issued to Dwight L. Smith and Marvin Elkins, on Aug. 1, 1989. The device is a modification of the prior disclosure in that other types of intermediate and impervious layers are employed to immobilize insects. U.S. Pat. No. 4,050,417, which issued to Robert P. Ellis on Sep. 27, 1977, discloses a cat and dog combination stretcher and scratcher which gives the animal a preference for stretching on the smooth side or scratching on the rougher side. The action of scratching on the rougher side causes an insecticide to be emitted. U.S. Pat. No. 4,860,689, which issued to Robert M. Stewart on Aug. 29, 1989, discloses a pet lounge for providing a head rest for the animal.

While the above mentioned devices are functional and well suited for their intended usage, none of these devices disclose a mat specifically designed to collect loose fur as well as dispense an insecticide. Further, the devices described in the above listed patents have apparently not met with commercial success. Accordingly, it can be appreciated that there exists a continuing need for new and improved animal mats which provide at least for loose hair collection or insecticide dispensing. In this respect, the present invention substantially fulfills this need.

SUMMARY OF THE INVENTION

In view of the foregoing disadvantages inherent in the known types of mats for domestic animals now present in the prior art, the present invention provides an improved mat wherein the same can be used for collecting fur and dispensing insecticide. As such, the general purpose of the present invention, which will be described subsequently in greater detail, is to provide a new and improved mat for domestic animals which has all the advantages of the prior art mats and none of the disadvantages.

To attain this, the present invention comprises a simple and inexpensive mat particularly suitable for domestic animals to provide a means of collecting loose fur. The mat is rectangularly shaped and in a preferred embodiment is formed from a top and bottom layer of biodegradable paper and an intermediate layer of cellulose material. Since the same material is used on both sides of the mat, it can be adapted to lay on the floor with either side facing upwards. The rough texture and static electricity of the paper along with the movement of the animal on the mat enables it to collect the loose fur. Small packages of insect killing powder can also be incorporated into the construction of the mat so as to facilitate both insect and loose hair control.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out it various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved animal mat which has all the advantages of the prior art animal mats and none of the disadvantages.

It is another object of the present invention to provide a new and improved animal mat which may be easily and efficiently manufactured and marketed.

It is a further object of the present invention to provide a new and improved animal mat which is of a durable and reliable construction.

An even further object of the present invention is to provide a new and improved animal mat which is susceptible of a low cost of manufacture with regard to both materials and labor, and which accordingly is then susceptible of low prices of sale to the consuming public, thereby making such animal mats economically available to the buying public.

Still yet another object of the present invention is to provide a new and improved animal mat which provides in the apparatuses and methods of the prior art some of the advantages thereof, while simultaneously overcoming some of the disadvantages normally associated therewith.

Still another object of the present invention is to provide a new and improved animal mat which provides a means for collecting fur.

Yet another object of the present invention is to provide a new and improved animal mat which is biodegradable.

Even still another object of the present invention is to provide a new and improved animal mat which is disposable, as well as being utilizable to dispense insecticide.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
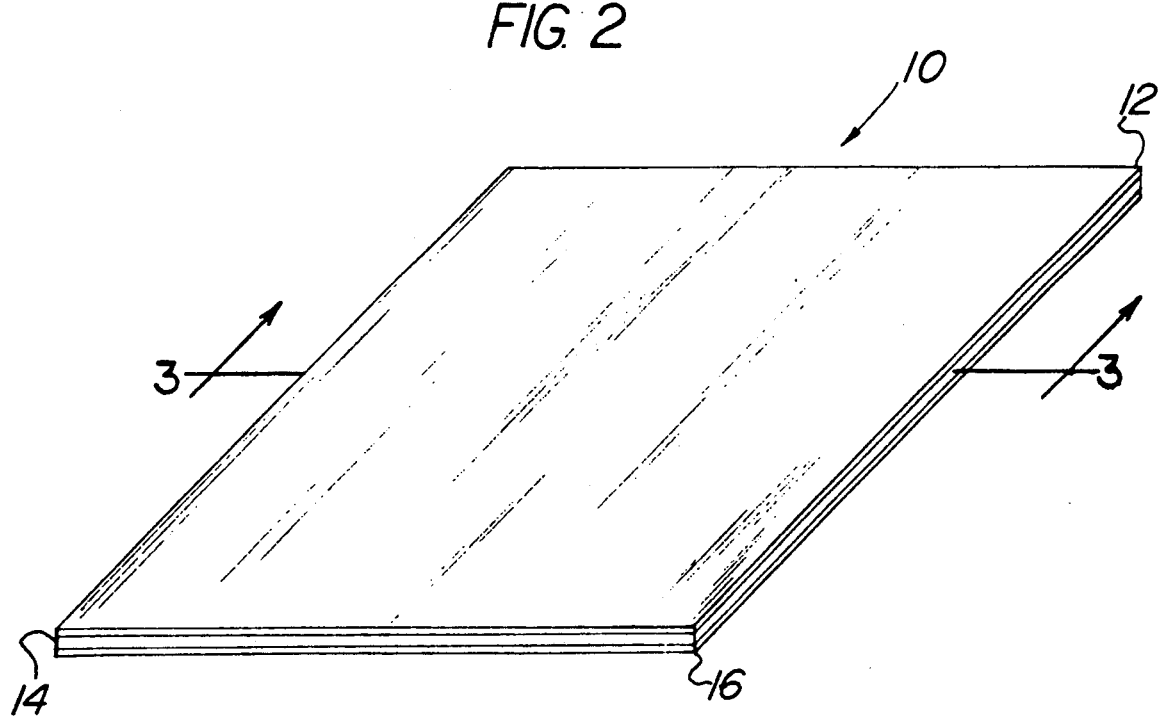
FIG. 2 is a perspective view of a first embodiment of the invention.
Figure 3:
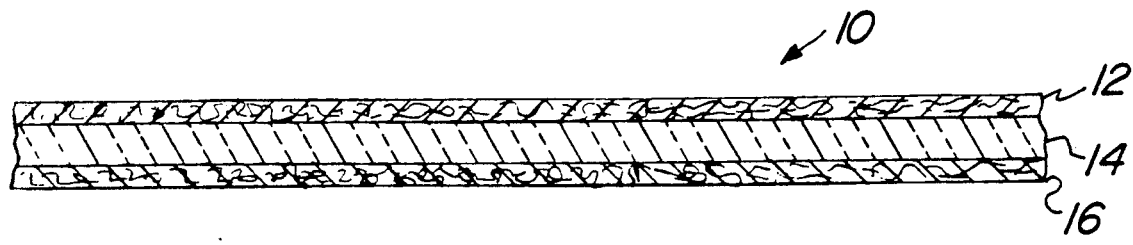
FIG. 3 is a cross sectional view of the invention as viewed along the line 3—3 shown in FIG. 2.

With reference now to the drawings, and in particular to FIGS. 2 and 3 thereof, a new and improved cat mat embodying the principles and concepts of the present invention and generally designated by the reference numeral 10 will be described.

Figure 1:
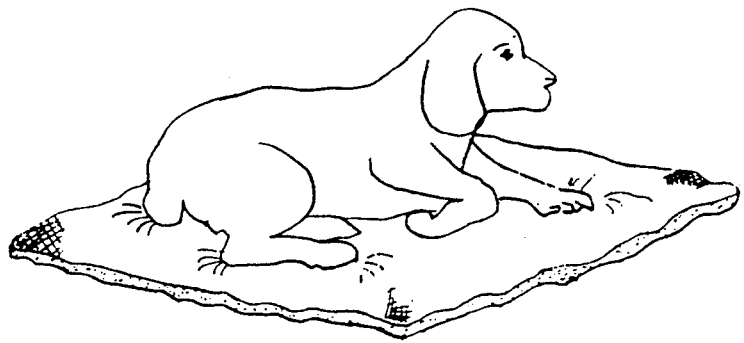
FIG. 1 is a perspective view of a prior art invention.

Initially, reference is made to FIG. 1 of the drawings wherein a typical prior art animal mat is illustrated. This prior art mat is similar in function to the mat comprising the present invention; however, it is designed to immobilize insects and would defeat the intent and purpose of the invention. The mat shown in FIG. 1 is particularly described in U.S. Pat. No. 4,649,861 and U.S. Pat. No. 4,852,517. This mat includes an impervious top layer, which allows insects to travel into the intermediate layer where they are immobilized by an adhesive, and a bottom layer which is impervious to insects.

This prior art mat is designed to accomplish a totally different purpose than the present invention, i.e., it is designed to capture and eliminate insects. The present invention, on the other hand, is designed to provide a simple, disposable mat which collects fur as well as providing for an insect control function.

The first version of the mat 10 is illustrated in FIGS. 2 and FIG. 3. The device 10 is of very simple construction and consists of a top layer 12, an intermediate layer 14 and a bottom layer 16 bonded together by a ordinary commercial adhesive. The top layer 12 and bottom layer 16 would use identical materials and would preferably be constructed of ordinary kraft paper. Kraft paper, which is typically composed of recycled material, is also biodegradable. Since the same material is used on both sides of the mat 10, it can be adapted to lay on the floor of a room or other desired place with either side facing upwards. The rough texture (or static electricity) of the paper and the movement of the animal on the mat 10 enables it to collect loose fur. The intermediate layer 14 would preferably be constructed of a biodegradable cellulose insulation material. The thickness of the intermediate layer 14 is a tradeoff between the weight of the animal and the desired density of the cellulose material.

Figure 4:
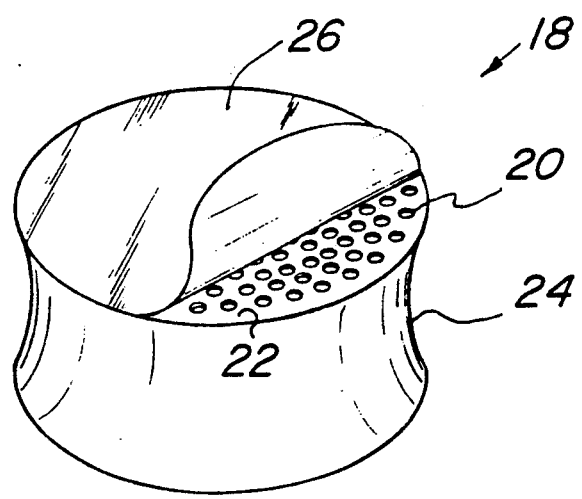
FIG. 4 is a perspective view of an insecticide dispensing container utilizable in an alternative embodiment of the invention.

FIG. 4 of the drawings illustrates an insecticide holding container 18 formed from a flexible plastic material and having a plurality of through-extending apertures 20 positioned on a topmost portion 22 thereof. The cylindrical sidewall 24 of the container 18 is concavely shaped to facilitate its retention within the structure of a mat 10 as will be subsequently described in greater detail. Additionally, a peelably adhesive plastic cover 26 is used to cover the topmost portion 22.

Figure 5:
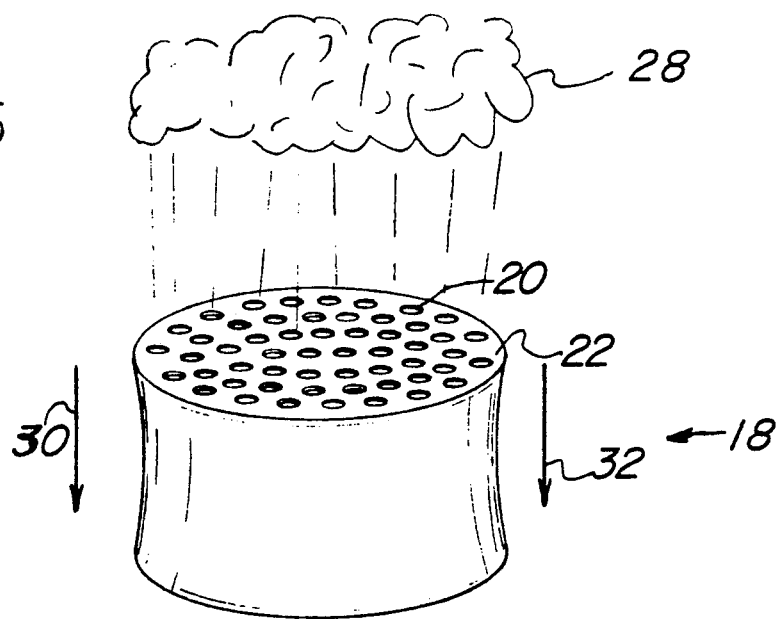
FIG. 5 is a perspective view illustrating a use of the container shown in FIG. 4.

As best illustrated in FIG. 5 of the drawings, once the cover 26 is removed from the topmost portion 22 of the container 18, the apertures 20 are totally exposed so as to permit the egress of a powdered insecticide 28 from the container when the same is compressed in the direction of the arrows 30, 32.

Figure 6:
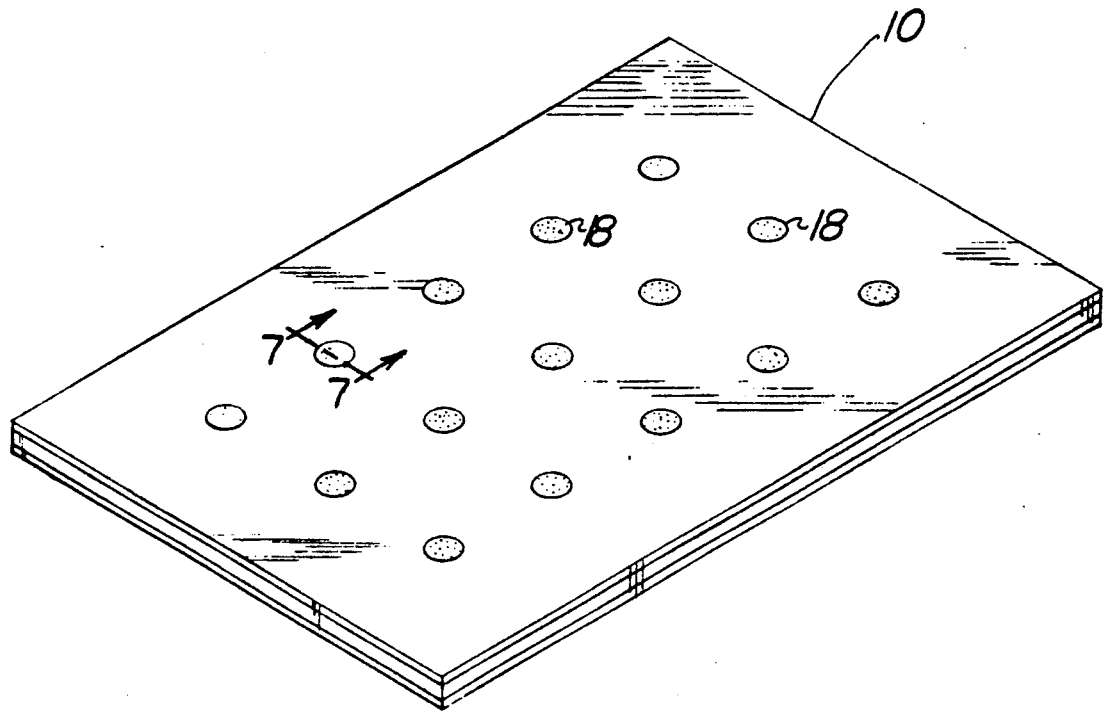
FIG. 6 is a perspective view of a second embodiment of the invention wherein such second embodiment makes use of the dispensing container shown in FIG. 4.
Figure 7:
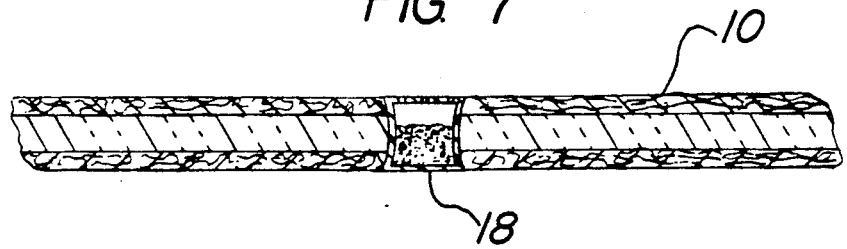
FIG. 7 is a cross-sectional view of the second embodiment of the invention as taken along the line 7—7 in FIG. 6.

As illustrated in FIG. 6, a plurality of the containers 18 may be selectively positioned within provided apertures formed in an animal mat 10 and as aforementioned, the concavely shaped sidewalls 24 serve to retain each of the containers in frictional engagement with the mat apertures. In this regard, FIG. 7 of the drawings illustrates just how the concavely shaped sidewalls 24 serve to firmly position each container 18 within a mat aperture.

In use then, a user of the mat 10 shown in FIG. 6 needs only to remove one or more of the peelable closures 26 from a selected number of the insecticide dispensing containers 18 so that insecticide is dispensed from the containers and onto an animal when it reclines upon the mat. Upon determining that the open insecticide containers 18 are empty, additional containers can be exposed by removing additional peelable closures 26.

Figure 8:
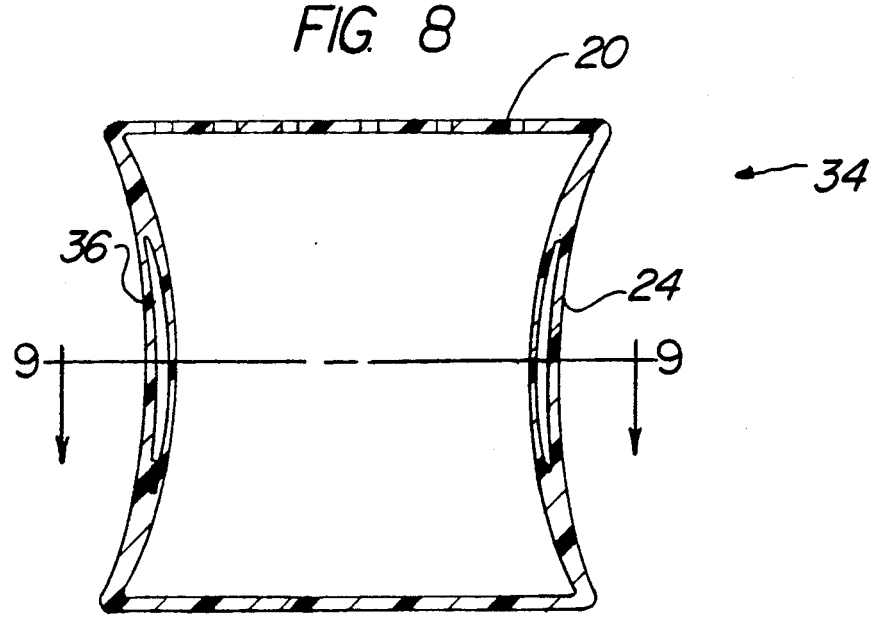
FIG. 8 is a cross-sectional view of the container shown in FIG. 4.
Figure 9:
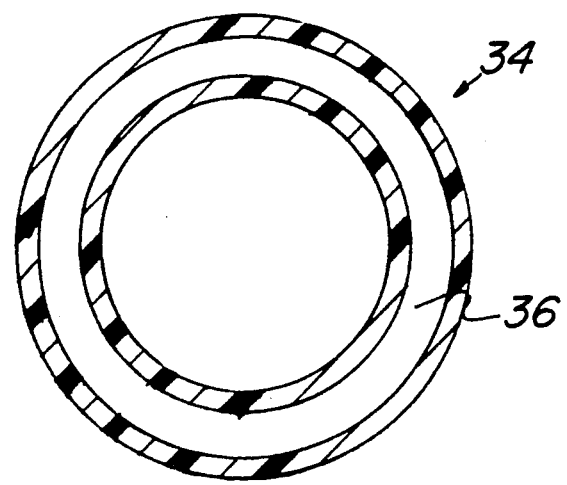
FIG. 9 is a cross-sectional view of the container of FIG. 8 as viewed along the line 9—9.

FIGS. 8 and 9 of the drawings illustrate a modified embodiment of the insecticide dispensing container wherein such modified embodiment is identified by the reference numeral 34. In this modified version of the insecticide dispensing container 34, a mid a dash section of the concavely shaped wall structure 24 is provided with a sealed cylindrically-shaped air chamber 36. The air chamber 36 operates as a fluid spring to provide rigidity to the concavely-shaped sidewall 24 while also serving to effect a shape retaining objective for the container. In this regard, through the use of the air chamber 36, the container 34 will maintain its shape after repeated compressions effected by an animal moving onto and off of the mat 10. As such, air continually ingresses and egresses from the apertures 20 to continually dispense insecticide as long as a supply is available.

With respect to the manner of usage and operation of the above described invention, the same should be apparent from the present disclosure. Therefore, no further discussion of the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved animal mat comprising:
a top layer of conventional craft paper;
an intermediate layer of cellulose insulation materials;
a bottom layer of craft paper;
adhesive means to bond said top and bottom layers to said intermediate layers; and
insecticide dispensing means including at least one insecticide dispensing container which effects an emission of insecticide upon a compression thereof, said insecticide dispensing container being cylindrically shaped to include a circumferentially positioned concavely-shaped outer sidewall to facilitate a secure fractional engagement and positioning of said container within a through-extending aperture formed in said mat.

2. A new and improved animal mat comprising:
a top layer of conventional craft paper;
an intermediate layer of cellulose insulation material;
a bottom layer of craft paper;
adhesive means to bond said top and bottom layers to said intermediate layers; and
insecticide dispensing means including at least one insecticide dispensing container which is cylindrically shaped and which includes a circumferentially positioned concavely-shaped outer sidewall to facilitate a secure frictional engagement and position of said container within said mat, said insecticide dispensing container further including a pneumatic spring structure formed in said sidewall to provide a shape retention function on said container.

3. The new and improved animal mat as described in claim 2, wherein said pneumatic spring structure is formed as a cylindrically shaped air pocket in said sidewall.

* * * * *